Nov. 11, 1969 M. IVEC 3,478,248
TRANSISTOR MULTIVIBRATOR FLASHER CIRCUIT
Filed Nov. 13, 1967
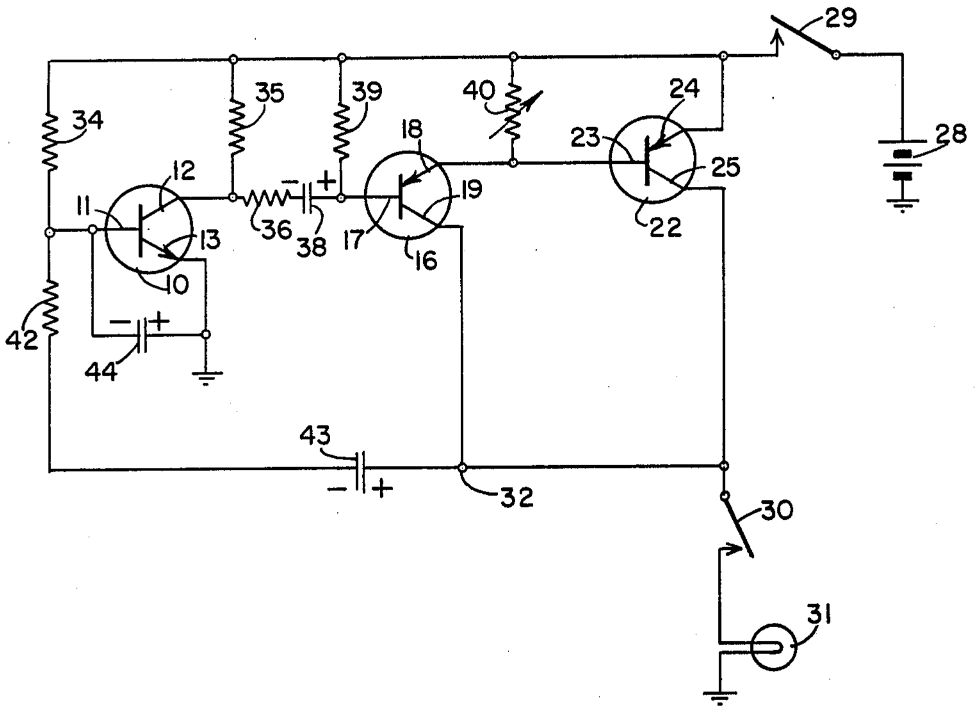
Inventor
MARTIN IVEC
BY Mueller, Aichele & Rauner
ATTYS.

United States Patent Office 3,478,248

Patented Nov. 11, 1969

3,478,248

TRANSISTOR MULTIVIBRATOR FLASHER CIRCUIT

Martin Ivec, Joliet, Ill., assignor to Motorola, Inc., Franklin Park, Ill., a corporation of Illinois Filed Nov. 13, 1967, Ser. No. 682,055
Int. Cl. H05b 39/09
U.S. Cl. 315—205 2 Claims

ABSTRACT OF THE DISCLOSURE

A flasher circuit incorporating a multivibrator circuit for timing and in which one of the multivibrator transistors is the driver for an output transistor. The energizing currents for the driver as well as the output transistor are supplied through the flasher lamp so that disconnection of the lamp prevents operation of the multivibrator and output transistor.

Background of the invention

In flasher units made for use in automobiles a multivibrator circuit commonly provides the electrical pulses required. In order to reduce manufacturing costs one of the multivibrator transistors acts as a driver transistor to furnish power to an output transistor which is turned on and off by the multivibrator. Because of the design of automobile electrical systems it is difficult to produce a flasher circuit which may be incorporated in vehicles, particularly existing vehicles, in which the power can be completely removed from the flasher circuit with the automobile ignition turned on unless the vehicle is rewired. Thus the multivibrator may operate continuously causing the driver transistor to turn on to provide current to its load which is different from the load of the output transistor. This continuous action of the multivibrator circuit and driver circuit causes power to be unnecessarily dissipated in the system and undesirable wear on the electrical components. Further, the burnout or removal of the lamps used in the flasher will not prevent operation of the flashing circuit, in the event that it is separately operated by a switch.

Summary of the invention

It is, therefore, an object of this invention to provide an improved flasher circuit which is inoperative with the load removed from the circuit and which can be incorporated in existing vehicles.

In practicing this invention a flasher circuit is provided having a multivibrator circuit which provides the timing pulses for the operaton of the flasher. One of the transistors of the multivibrator circuit is also the driver circuit for an output transistor which is directly connected to to the load so that the only direct current path for the driver transistor output circuit is through the load. Thus removal of the load from the system prevents operation of the driver transistor and the multivibrator.

The invention is illustrated in the single drawing, a schematic showing an embodiment of this invention.

Referring to the drawing, a flasher circuit, including transistors 10, 16 and 22, is coupled to battery 28 through ignition switch 29 and to load 31 through control switch 30. Transistor 16 is the driver transistor and acts to bias on transistor 22. With transistors 16 and 22 conducting power is supplied to load 31.

With switch 29 closed and switch 30 open, a bias current is supplied to base 11 of transistor 10 through resistor 34. The value of resistor 34 is chosen so that transistor 10 is only slightly conducting. The conduction of transistor 10 causes current to flow through resistor 35 resulting in a voltage drop across resistor 35. This voltage drop is coupled to base 17 of transistor 16 through resistor 36 and capacitor 38, and appears as a momentary pulse on base 17 of transistor 16. However, since switch 30 is open, the collector 19 of driver transistor 16 has no direct current path to battery 28 and no current flows from emitter 18 to collector 19. With transistor 16 non-conducting, transistor 22 is also non-conducting.

When switch 30 is closed collectors 19 and 25 of transistors 16 and 19 respectively are coupled to the reference potential through load 31. In this example load 31 may be one or more lamps which are to be flashed by the circuit. Since both transistors 16 and 22 are not conducting, the potential at point 32 drops to the reference potential causing the potential at base 11 of transistor 10 to drop biasing off transistor 10. With transistor 10 completely cutoff, the potential on collector 12 rises slightly. When capacitor 43 charges through resistors 34 and 42 and load 31 the potential on base 11 rises to a value sufficient to bias transistor 10 to conduction. With transistor 10 biased to conduction, current flows through resistor 35 lowering the potential on collector 12. This drop in potential is coupled through resistor 36 and capacitor 38 as a negative pulse on base 17 of transistor 16 causing transistor 16 to conduct. Since collector 19 of transistor 16 is now connected to the reference potential through switch 30 and lamp 31, current flows through transistor 16 and through lamp 31 causing the potential at point 32 to rise slightly. This slight rise in potential is coupled back to transistor base 11 of transistor 10 through capacitor 43 and resistor 42, as a positive pulse, increasing the conduction of transistor 10. The increase in conduction of transistor 10 lowers the voltage on collector 12 still further and this drop in potential on collector 12 is coupled to base 17 to increase the conduction of transistor 16. The conduction of transistor 16 also causes transistor 22 to conduct. This regenerative action continues until transistors 10, 16 and 22 are biased completely to conduction. Transistor 22 is the power output transistor and provides most of the current for load 31.

With transistors 16 and 22 biased to conduction the potential at point 32 remains constant and capacitor 43 charges through the base emitter region of transistor 10 and resistor 42 to the reference potential. As capacitor 43 charges, the potential on the base 11 is reduced until the conduction of transistor 10 is reduced. The reduction of current flow through transistor 10 causes the potential at collector 12 to increase. This increase in potential at collector 12 is coupled to base 17 of transistor 16 through resistor 36 and capacitor 38 causing the bias current to base 17 of transistor 16 to be reduced. The reduction in bias current to transistor 16 reduces the current supplied to lamp 31 and a reduction in potential at point 32. The reduction in potential at point 32 is coupled back to base 11 through capacitor 43 and resistor 42 further decreasing the conduction of transistor 10. This regenerative action continues until transistors 10, 16 and 22 are completely cutoff. The cutoff condition continues until the charge on capacitor 43 is changed sufficiently to permit transistor 10 to be biased to conduction.

A capacitor 44 is coupled from base 11 to a reference potential and acts as a bypass for interfering signals which may be present and which would bias transistor 10 to conduction. Capacitor 44 is particularly important when the flasher is used in an automotive environment as the circuit would be subject to pulses caused by ignition noise. Capacitor 44 may be a polarized capacitor of the electrolytic type in order to obtain a large capacitance in a small package. Capacitor 44 is coupled to the circuit with its polarity reversed from the direct current polarity of transistor 10. This can be done since the base 11-emitter 13 diode of transistor 10 limits the maximum positive voltage which can appear on base 11 to one volt or less. The negative voltage developed by the discharge of capacitor 43 can develop very high negative voltages on base 11 which could cause breakdown of capacitor 44 if capacitor 44 were poled with its polarity the same as the direct current voltages applied to the transistor.

An example of the values of the components used in the circuit illustrated is as follows. The invention is not limited to these component values.

| | |
|---|---|
| Transistor **10** | M54C. |
| Transistor **16** | M833. |
| Transistor **22** | 2N176. |
| Capacitor **38** | 250 mfd. |
| Capacitor **43** | 20 mfd. |
| Capacitor **44** | 5 mfd. |
| Resistance **34** | 18K ohms. |
| Resistance **35** | 560 ohms. |
| Resistance **36** | 390 ohms. |
| Resistance **39** | 3.3K ohms. |
| Resistance **42** | 820 ohms. |
| Resistance **40** | 40Ω,B=3000 thermistor. |

I claim:

1. In an electrical circuit for operating at least one flasher lamp and including a power supply having output and reference terminals with the lamp coupled to the reference terminal, a switching circuit for periodically coupling the output terminal to the lamp and including in combination, a driver transistor having an input electrode coupled to the output terminal, a collector electrode and a control electrode, an output transistor having an input electrode coupled to the output terminal, a control electrode coupled to said driver transistor and a collector electrode, said driver transistor and output transistor collector electrodes being directly connected together and further coupled to the lamp whereby the only direct current path from each of said driver transistor and output transistor collector electrodes to the reference terminal is through the lamp, a control transistor having an output electrode coupled to the output terminal, a control electrode and a further electrode coupled to the reference terminal, a first feedback path having first series capacitance means therein and coupling said driver transistor collector electrode to said control transistor control electrode to provide a first feedback signal thereto, a second feedback path including second series capacitance means coupling said control transistor output electrode to said driver transistor control electrode, and resistance means coupling the output terminal to said control transistor control electrode for providing a bias current therefor, said resistance means having a value whereby said bias current through said resistance means is limited to a magnitude whereby the conduction of said control transistor is less than the saturation current thereof.

2. The switching circuit of claim 1 wherein, polarized filter capacitance means is coupled between said control transistor control electrode and the reference terminal, said polarized filter capacitance means being poled opposite to the polarity of said control electrode further electrode junction diode.

References Cited

UNITED STATES PATENTS

| | | | |
|---|---|---|---|
| 3,382,405 | 5/1968 | Johnson | 315—80 |
| 3,263,119 | 7/1966 | Scholl | 331—113 X |

ROY LAKE, Primary Examiner

SIEGFRIED H. GRIMM, Assistant Examiner

U.S. Cl. X.R.

315—209; 340—81, 331; 331—113